US012593286B2

(12) United States Patent
Zhang et al.

(10) Patent No.: US 12,593,286 B2
(45) Date of Patent: Mar. 31, 2026

(54) DETERMINING AN INITIAL PRACH PREAMBLE TRANSMISSION POWER BASED ON HISTORICAL COMPLETED PRACH PROCEDURES

(71) Applicant: QUALCOMM Incorporated, San Diego, CA (US)

(72) Inventors: Hao Zhang, Shanghai (CN); Wei He, Shanghai (CN); Yan Wang, Shanghai (CN); Jian Li, Shanghai (CN); Aimin Shang, Shanghai (CN); Miao Fu, Shanghai (CN); Chaofeng Hui, Beijing (CN); Yuankun Zhu, Shanghai (CN); Fojian Zhang, Shenzhen (CN)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 18/251,050

(22) PCT Filed: Dec. 14, 2020

(86) PCT No.: PCT/CN2020/136028

§ 371 (c)(1),
(2) Date: Apr. 28, 2023

(87) PCT Pub. No.: WO2022/126302

PCT Pub. Date: Jun. 23, 2022

(65) Prior Publication Data

US 2023/0413185 A1      Dec. 21, 2023

(51) Int. Cl.
| | |
|---|---|
| *H04W 52/22* | (2009.01) |
| *H04W 36/14* | (2009.01) |

(Continued)

(52) U.S. Cl.
CPC ......... *H04W 52/228* (2013.01); *H04W 36/14* (2013.01); *H04W 52/50* (2013.01); *H04W 74/0833* (2013.01); *H04W 74/0836* (2024.01)

(58) Field of Classification Search
None
See application file for complete search history.

(56) References Cited

U.S. PATENT DOCUMENTS

| | | | |
|---|---|---|---|
| 8,848,667 B2 * | 9/2014 | Kawasaki | ......... H04W 56/0085 370/331 |
| 9,241,298 B2 | 1/2016 | Cherian et al. | |

(Continued)

FOREIGN PATENT DOCUMENTS

| | | |
|---|---|---|
| CN | 108199786 A | 6/2018 |
| WO | 2013075063 A1 | 5/2013 |
| WO | 2018228368 A1 | 12/2018 |

OTHER PUBLICATIONS

Supplementary European Search Report—EP20965323—Search Authority—The Hague—Jul. 17, 2024.

(Continued)

*Primary Examiner* — Mariela Vidal Carpio
(74) *Attorney, Agent, or Firm* — Muncy, Geissler, Olds & Lowe, P.C.

(57) ABSTRACT

In an aspect, a UE may determine an initial transmission power for transmission of a physical random access channel (PRACH) preamble of a PRACH procedure based upon a final PRACH preamble transmission power associated with a set of historical completed PRACH procedures. The UE may further attempt an initial transmission of the PRACH preamble based on the determined initial transmission power.

18 Claims, 13 Drawing Sheets

(51) Int. Cl.

| | | |
|---|---|---|
| *H04W 52/50* | (2009.01) | |
| *H04W 74/0833* | (2024.01) | |
| *H04W 74/0836* | (2024.01) | |

(56) References Cited

U.S. PATENT DOCUMENTS

| | | | | |
|---|---|---|---|---|
| 2009/0016266 A1* | 1/2009 | Kim | H04W 74/002 | |
| | | | | 370/328 |
| 2014/0362779 A1* | 12/2014 | Venkatachari | H04W 52/221 | |
| | | | | 370/329 |
| 2015/0036598 A1 | 2/2015 | Kilpatrick, II et al. | | |
| 2015/0036617 A1* | 2/2015 | Guo | H04W 52/50 | |
| | | | | 370/329 |
| 2015/0057011 A1* | 2/2015 | Di Girolamo | H04W 72/0446 | |
| | | | | 455/454 |
| 2017/0251460 A1* | 8/2017 | Agiwal | H04W 72/20 | |
| 2018/0376428 A1* | 12/2018 | Lin | H04W 52/50 | |
| 2019/0174270 A1* | 6/2019 | Shan | H04W 4/70 | |
| 2019/0335449 A1* | 10/2019 | Xiong | H04L 5/0053 | |
| 2020/0059967 A1* | 2/2020 | Kim | H04W 74/0833 | |
| 2020/0107277 A1 | 4/2020 | Jeon et al. | | |
| 2020/0236719 A1* | 7/2020 | Kim | H04W 52/48 | |
| 2020/0275489 A1* | 8/2020 | Ohlsson | H04W 74/006 | |
| 2020/0296765 A1* | 9/2020 | Kim | H04W 72/0453 | |
| 2020/0305094 A1* | 9/2020 | Ouchi | H04W 52/325 | |
| 2020/0374926 A1* | 11/2020 | Shah | H04W 24/10 | |
| 2021/0029737 A1* | 1/2021 | Pan | H04W 74/002 | |
| 2021/0136823 A1* | 5/2021 | Kim | H04W 52/50 | |
| 2021/0360610 A1* | 11/2021 | Kim | H04L 1/1858 | |
| 2021/0385801 A1* | 12/2021 | Shreevastav | H04L 1/0003 | |
| 2022/0030640 A1* | 1/2022 | Shi | H04W 52/146 | |
| 2022/0191945 A1* | 6/2022 | Yamamoto | H04W 52/146 | |
| 2022/0386389 A1* | 12/2022 | Geng | H04W 74/0836 | |
| 2023/0063026 A1* | 3/2023 | Reial | H04W 52/0235 | |
| 2023/0254899 A1* | 8/2023 | Roy | H04W 74/0833 | |
| | | | | 370/329 |

OTHER PUBLICATIONS

International Search Report and Written Opinion—PCT/CN2020/136028—ISA/EPO—Sep. 15, 2021.

Sumsung Electronics: "Power Ramping Support for NB IoT", 3GPP TSG-RAN WG2 NB-IoT Ad-hoc Meeting, R2-160520, Budapest, Hungary, Jan. 19-21, 2016, pp. 1-3, Section 2.

* cited by examiner

FIG. 3A

DETERMINING AN INITIAL PRACH PREAMBLE TRANSMISSION POWER BASED ON HISTORICAL COMPLETED PRACH PROCEDURES

CROSS-REFERENCE TO RELATED APPLICATIONS

The present Application for Patent claims priority to International Patent Application No. PCT/CN2020/136028, entitled "DETERMINING AN INITIAL PRACH PRE-AMBLE TRANSMISSION POWER BASED ON HIS-TORICAL COMPLETED PRACH PROCEDURES," filed Dec. 14, 2020, which is assigned to the assignee hereof and expressly incorporated herein by reference in its entirety.

BACKGROUND OF THE DISCLOSURE

1. Field of the Disclosure

Aspects of the disclosure relate generally to wireless communications, and more particularly to determining an initial physical random access channel (PRACH) transmission power based on historical completed PRACH procedures.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

An aspect is directed to a method of operating a user equipment (UE), comprising determining an initial transmission power for transmission of a physical random access channel (PRACH) preamble of a PRACH procedure based upon a final PRACH preamble transmission power associated with a set of historical completed PRACH procedures, and attempting an initial transmission of the PRACH preamble based on the determined initial transmission power.

Another aspect is directed to a user equipment (UE), comprising means for determining an initial transmission power for transmission of a physical random access channel (PRACH) preamble of a PRACH procedure based upon a final PRACH preamble transmission power associated with a set of historical completed PRACH procedures, and means for attempting an initial transmission of the PRACH preamble based on the determined initial transmission power.

Another aspect is directed to a user equipment (UE), comprising a memory, at least one transceiver, and at least one processor communicatively coupled to the memory and the at least one transceiver, the at least one processor configured to determine an initial transmission power for transmission of a physical random access channel (PRACH) preamble of a PRACH procedure based upon a final PRACH preamble transmission power associated with a set of historical completed PRACH procedure, and attempt an initial transmission of the PRACH preamble based on the determined initial transmission power.

Another aspect is directed to a non-transitory computer-readable medium containing instructions stored thereon, for causing at least one processor in a user equipment (UE) to determine an initial transmission power for transmission of a physical random access channel (PRACH) preamble of a PRACH procedure based upon a final PRACH preamble transmission power associated with a set of historical completed PRACH procedures, and attempt an initial transmission of the PRACH preamble based on the determined initial transmission power.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 3A to 3C are simplified block diagrams of several sample aspects of components that may be employed in wireless communication nodes and configured to support communication as taught herein.

DETAILED DESCRIPTION

Figure 1:
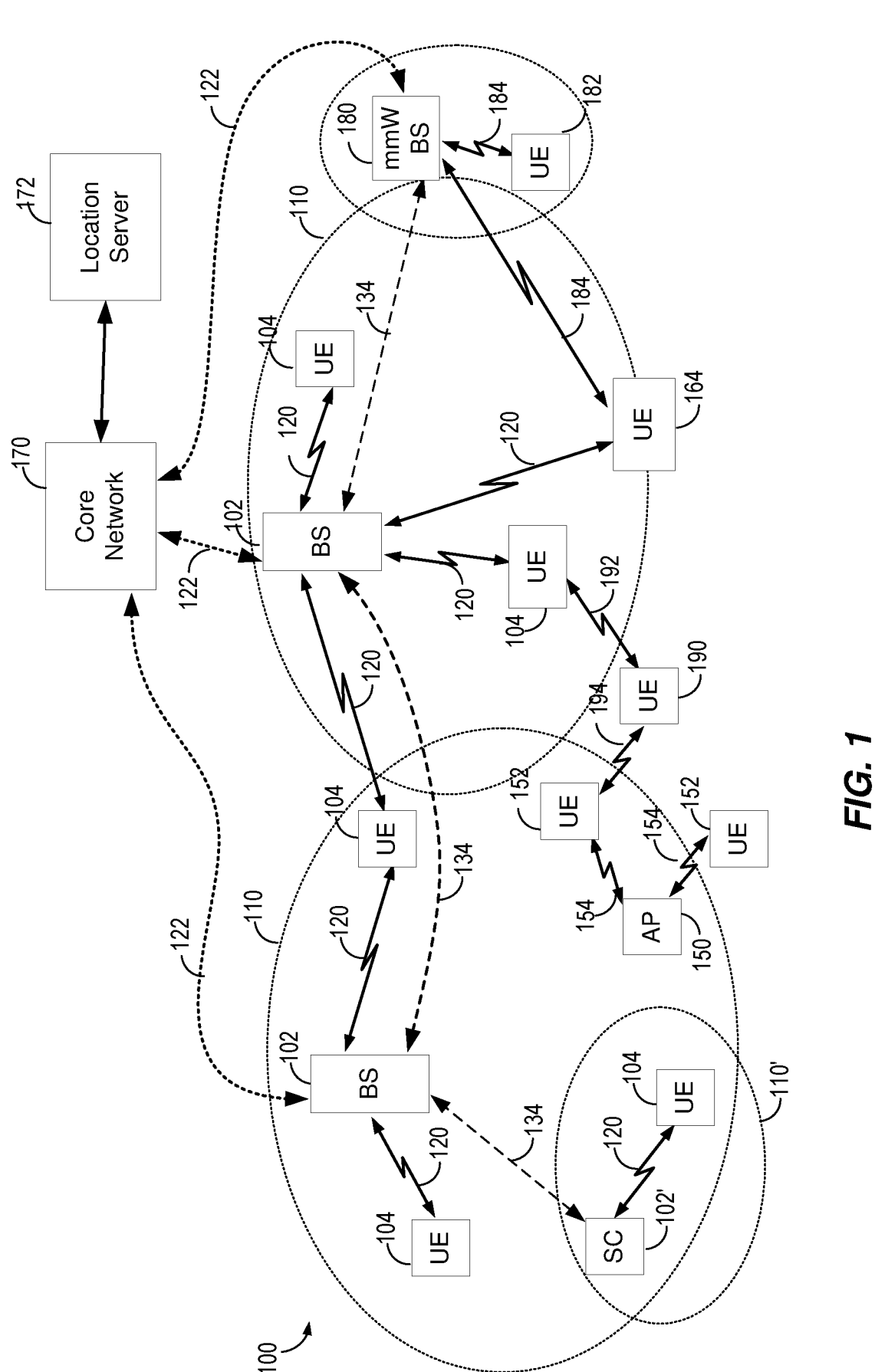
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. In some systems, a base station may correspond to a Customer Premise Equipment (CPE) or a road-side unit (RSU). In some designs, a base station may correspond to a high-powered UE (e.g., a vehicle UE or VUE) that may provide limited certain infrastructure functionality. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
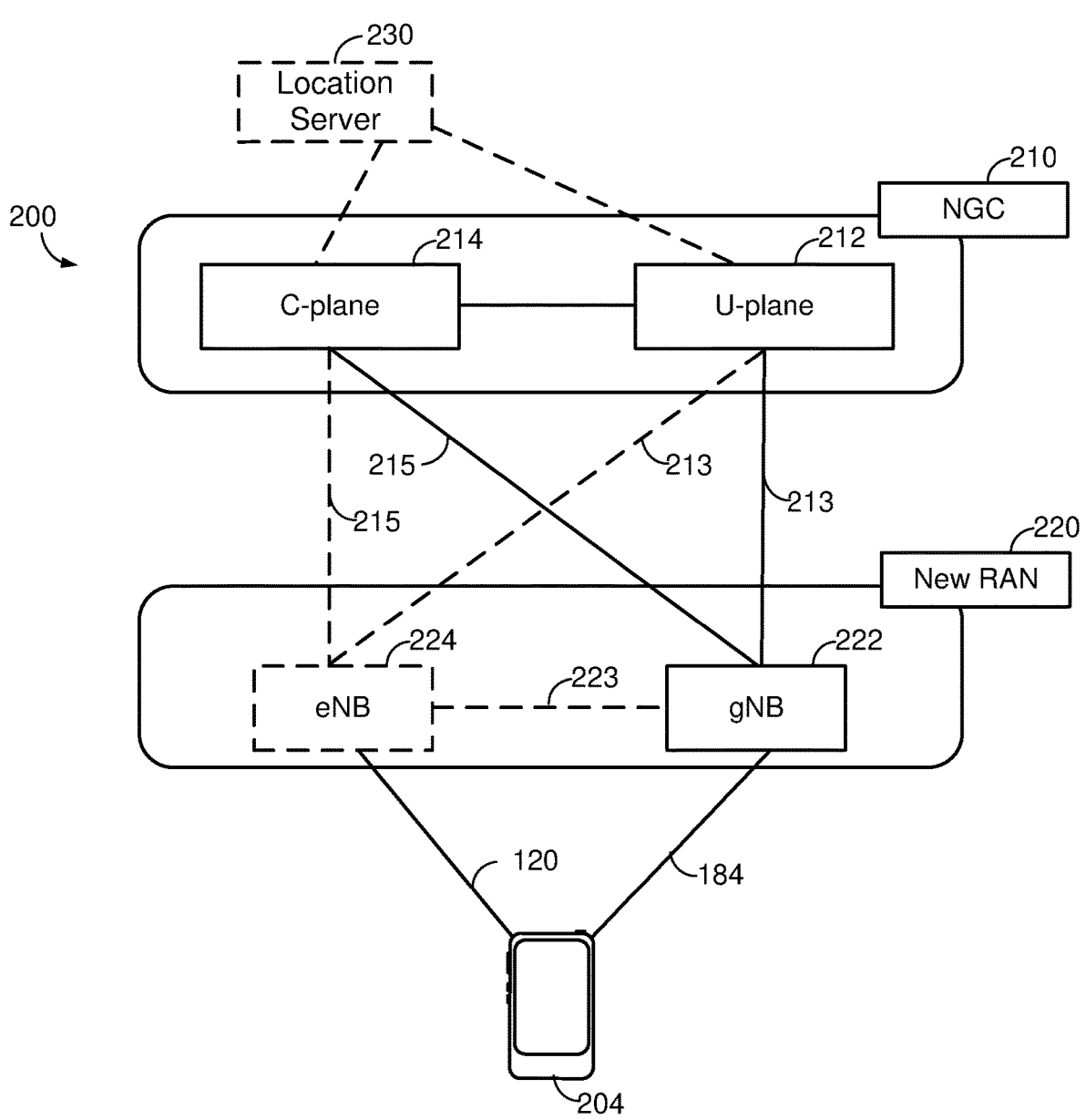
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
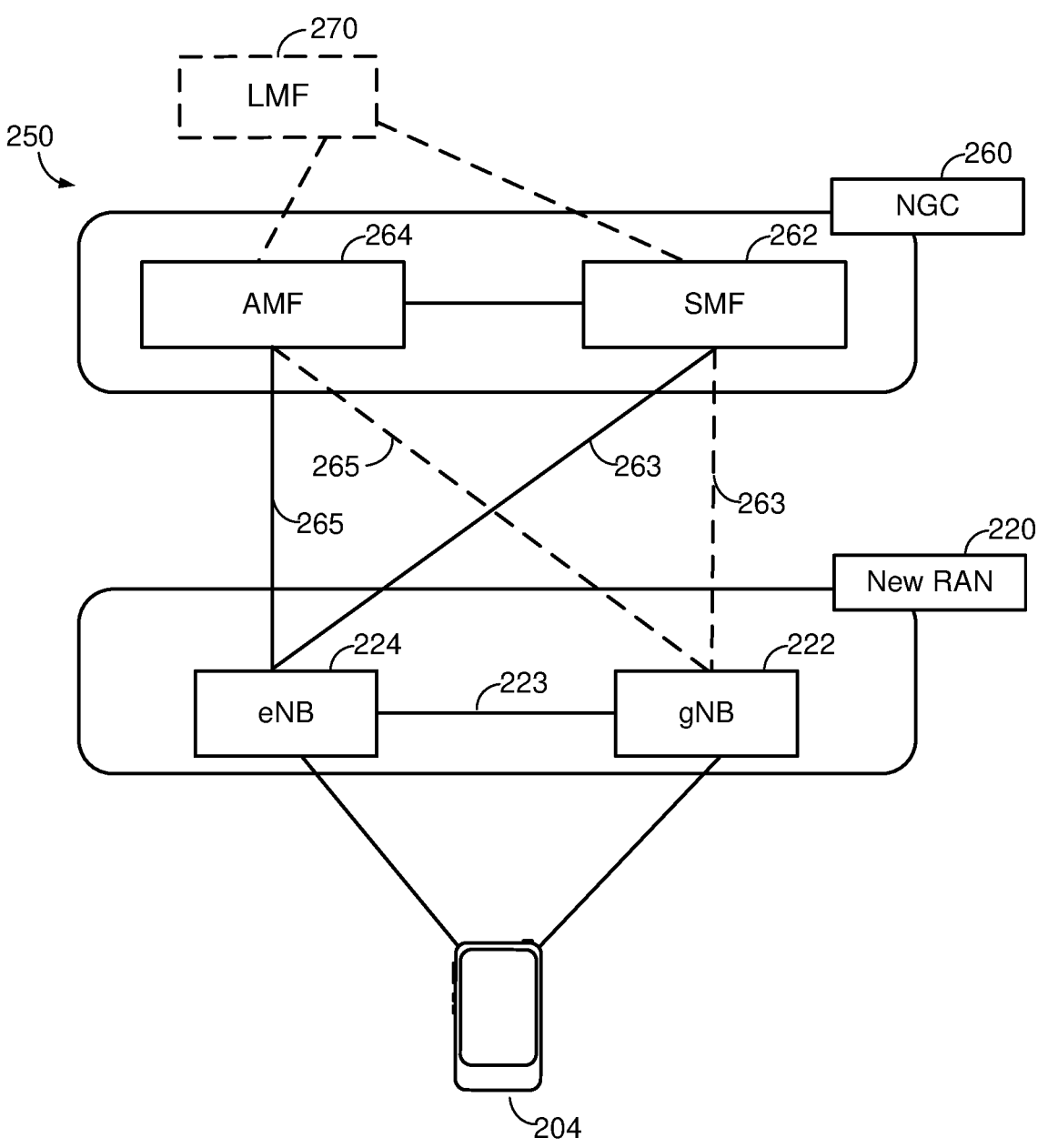

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
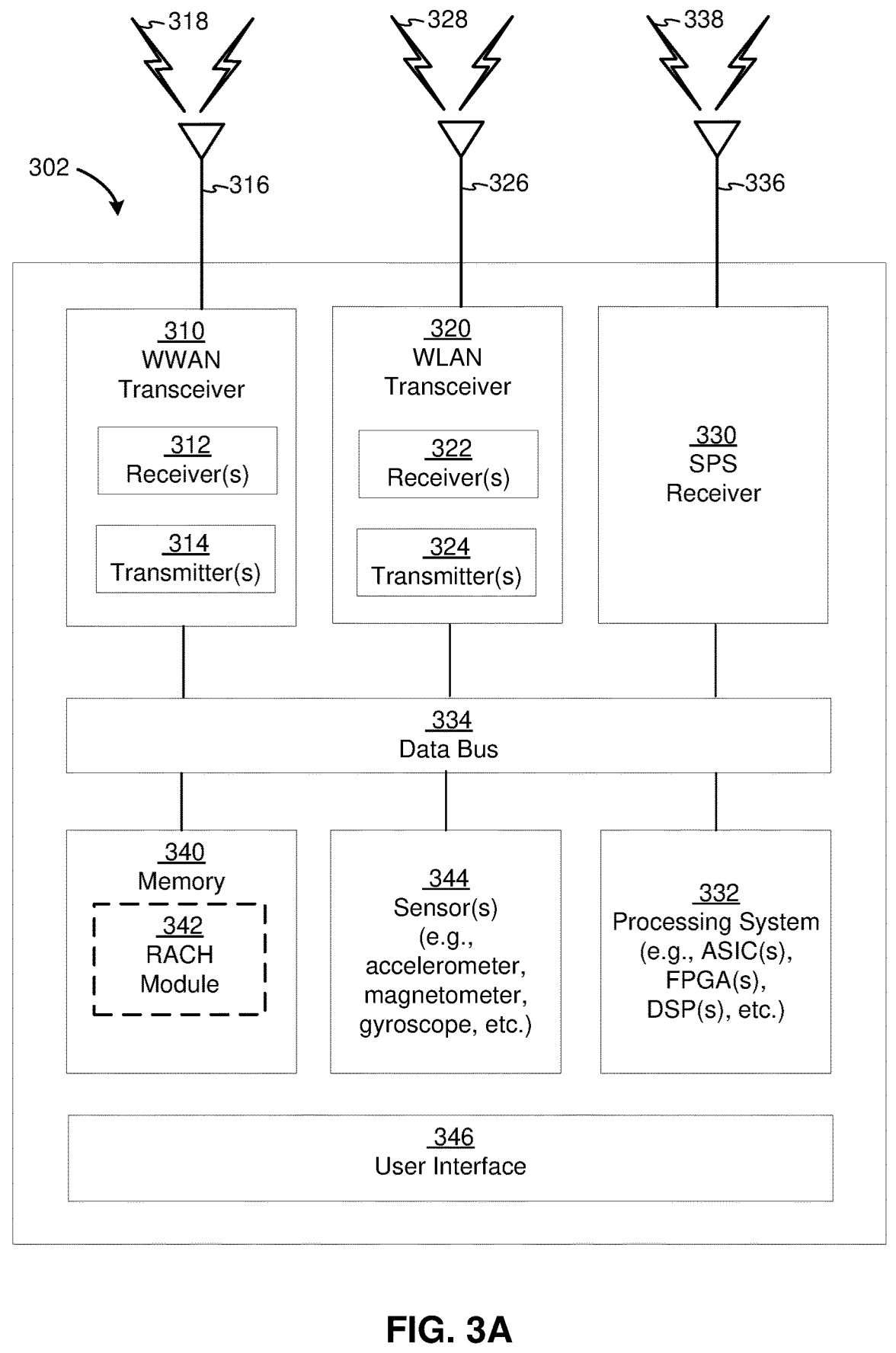
Figure 3B:
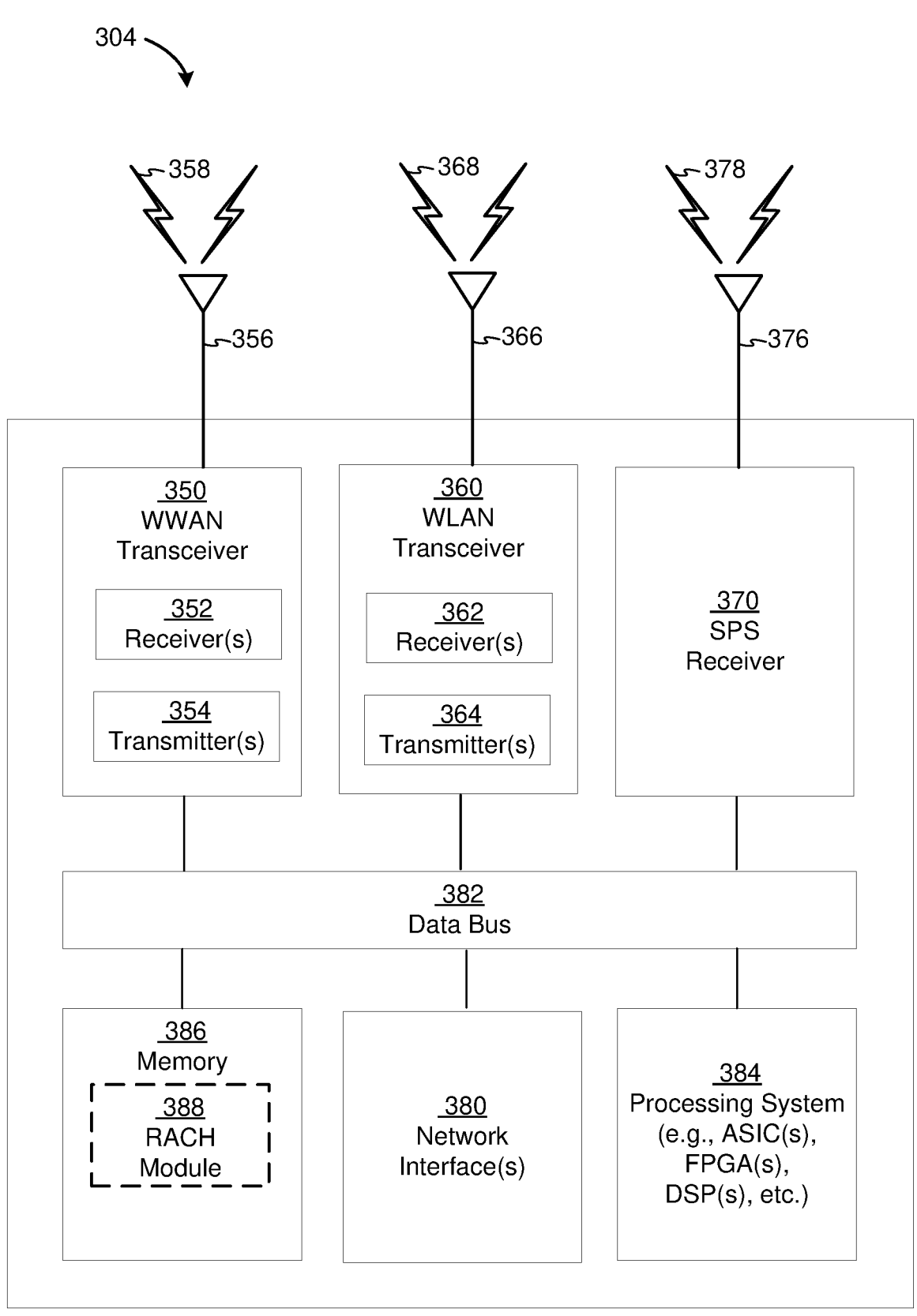
Figure 3C:
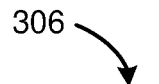
Figure 3C:
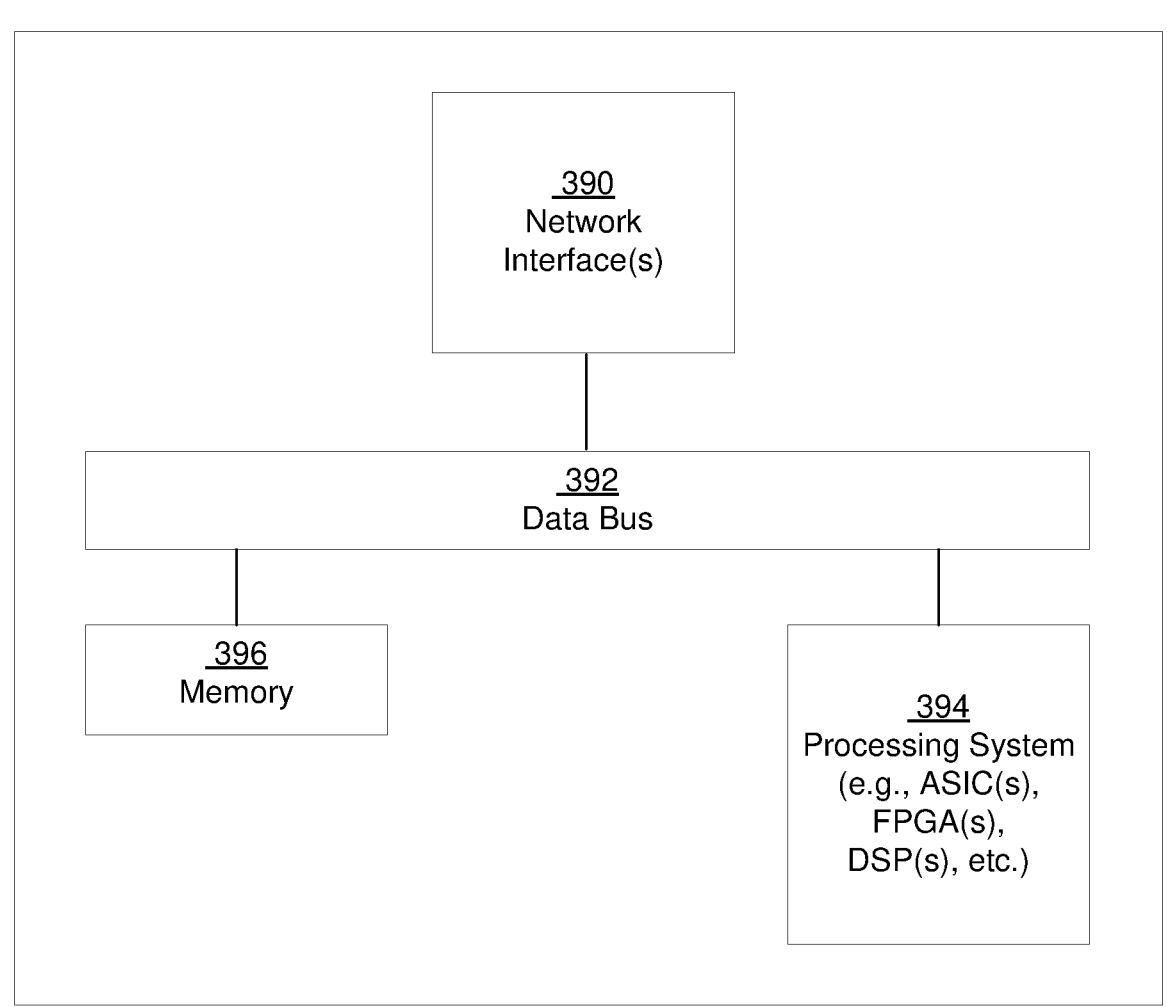

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, false base station (FBS) detection as disclosed herein and for providing other processing functionality. The base station 304 includes a processing system 384 for providing functionality relating to, for example, FBS detection as disclosed herein and for providing other processing functionality. The network entity 306 includes a processing system 394 for providing functionality relating to, for example, FBS detection as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, may include random access channel (RACH) modules 342, 388, respectively. The RACH modules 342, 388 may be hardware circuits that are part of or coupled to the processing systems 332, 384, respectively, that, when executed, cause the apparatuses 302, 304, to perform the functionality described herein. Alternatively, the RACH modules 342, 388 may be memory modules (as shown in FIGS. 3A-B) stored in the memory components 340, 386, respectively, that, when executed by the processing systems 332, 384, cause the apparatuses 302, 304 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the GPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 396 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RACH modules 342 and 388, etc.

Figure 4A:
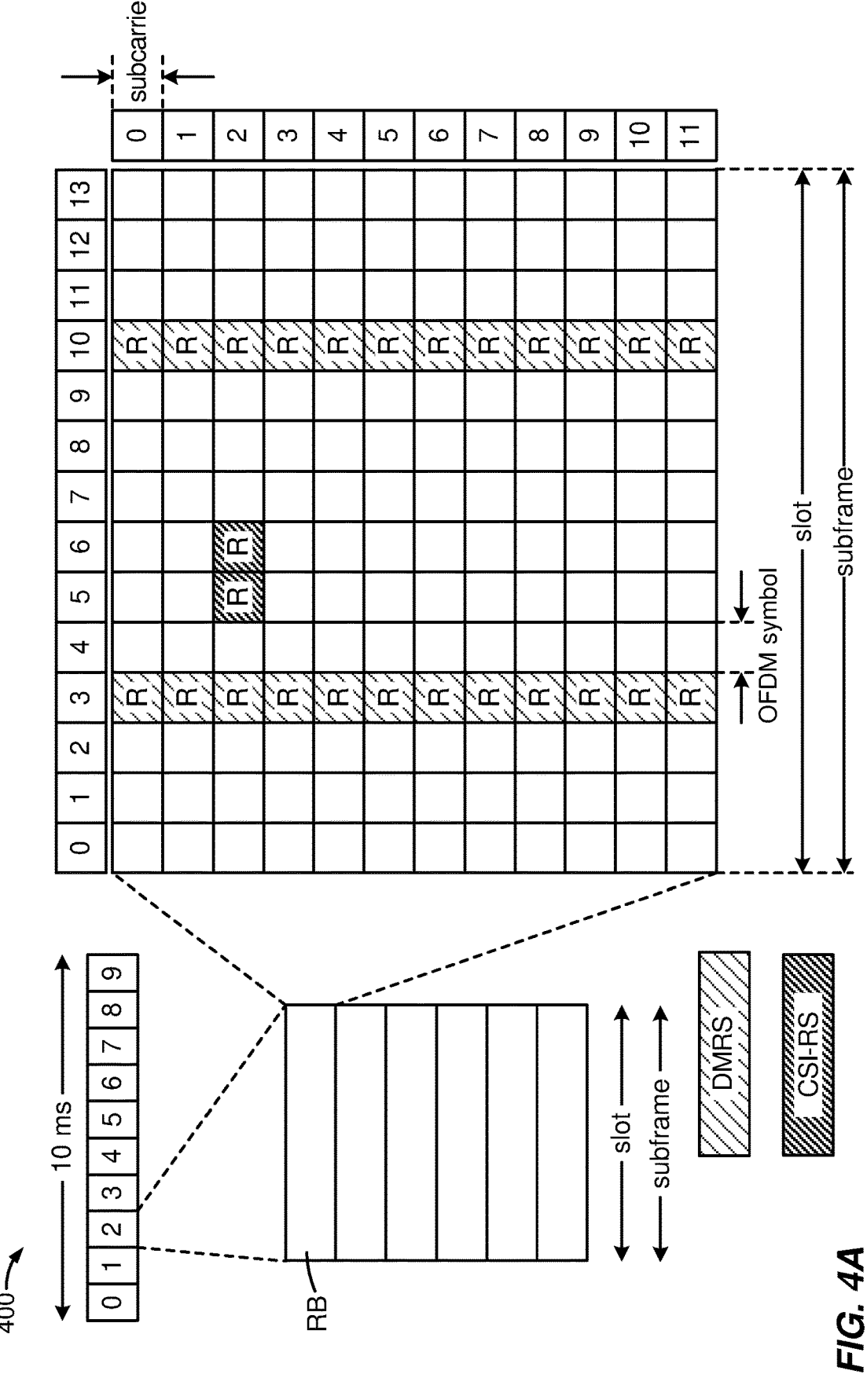
FIGS. 4A and 4B are diagrams illustrating examples of frame structures and channels within the frame structures, according to aspects of the disclosure.
Figure 4B:
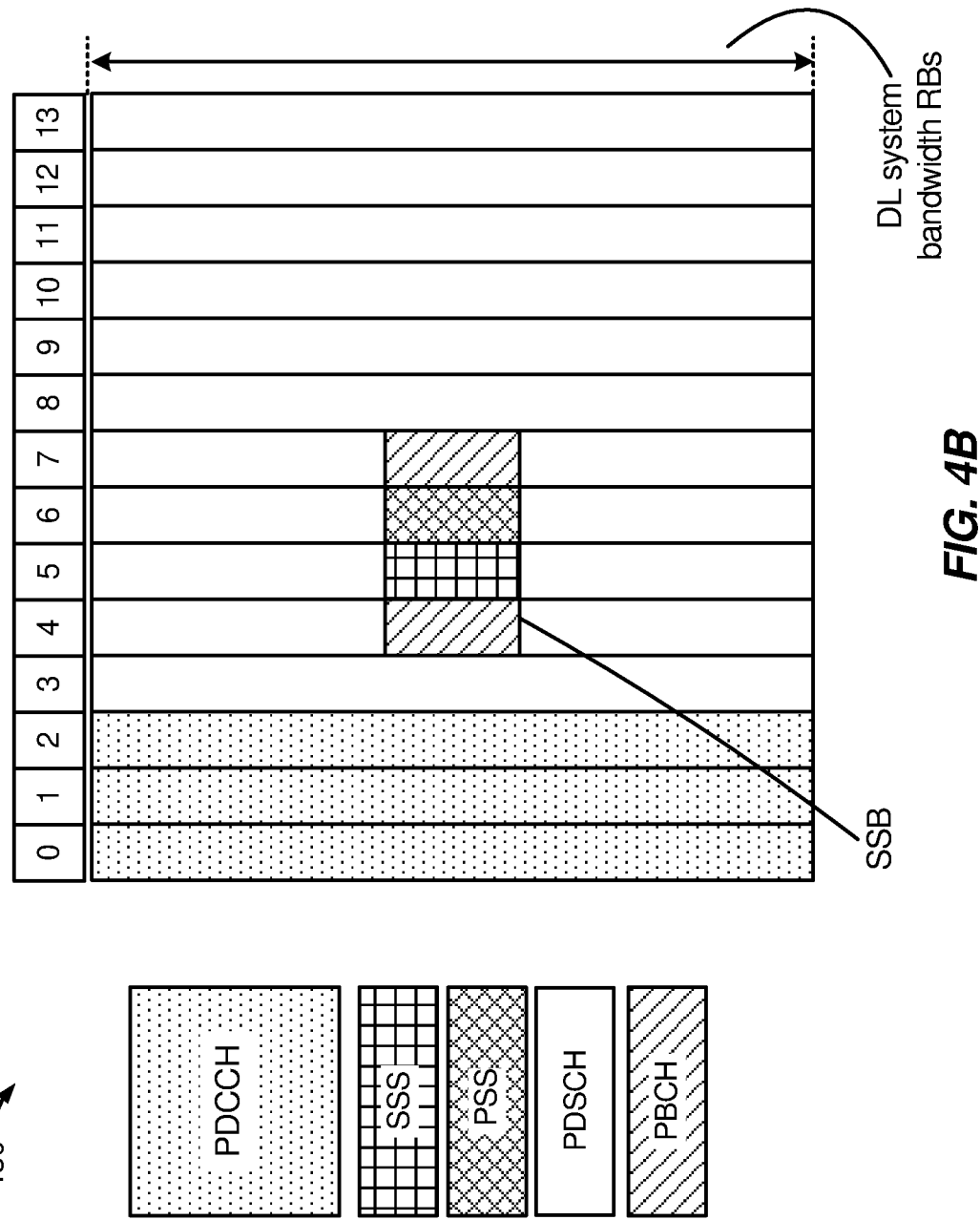

FIG. 4A is a diagram 400 illustrating an example of a DL frame structure, according to aspects of the disclosure. FIG. 4B is a diagram 430 illustrating an example of channels within the DL frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

TABLE 1

| Subcarrier spacing (kHz) | Symbols/ slot | slots/ subframe | slots/ frame | slot (ms) | Symbol duration (μs) | Max. nominal system BW (MHz) with 4K FFT size |
| --- | --- | --- | --- | --- | --- | --- |
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

In the examples of FIGS. 4A and 4B, a numerology of 15 kHz is used. Thus, in the time domain, a frame (e.g., 10 ms) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4A, some of the REs carry DL reference (pilot) signals (DL-RS) for channel estimation at the UE. The DL-RS may include demodulation reference signals (DMRS) and channel state information reference signals (CSI-RS), exemplary locations of which are labeled "R" in FIG. 4A.

FIG. 4B illustrates an example of various channels within a DL subframe of a frame. The physical downlink control channel (PDCCH) carries DL control information (DCI) within one or more control channel elements (CCEs), each CCE including nine RE groups (REGs), each REG including four consecutive REs in an OFDM symbol. The DCI carries information about UL resource allocation (persistent and non-persistent) and descriptions about DL data transmitted to the UE. Multiple (e.g., up to 8) DCIs can be configured in the PDCCH, and these DCIs can have one of multiple formats. For example, there are different DCI formats for UL scheduling, for non-MIMO DL scheduling, for MIMO DL scheduling, and for UL power control.

A primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the DL system bandwidth and a system frame number (SFN). The physical downlink shared channel (PDSCH) carries user data, broadcast system information not transmitted through the PBCH such as system information blocks (SIBs), and paging messages.

Figure 5:
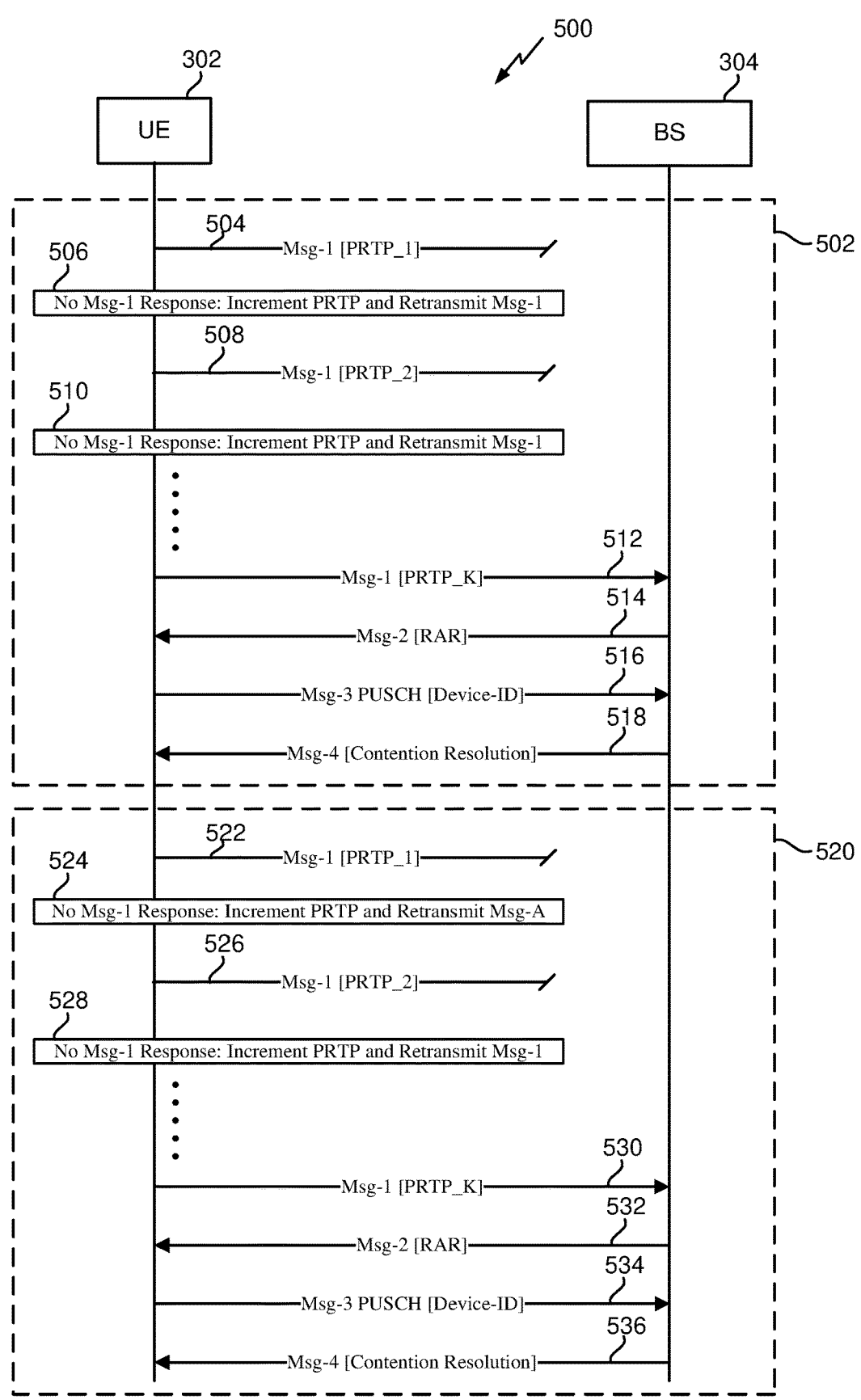
FIG. 5 illustrates a series of 4-Step Physical Random Access Channel (PRACH) procedures in accordance with an embodiment of the disclosure.
Figure 6:
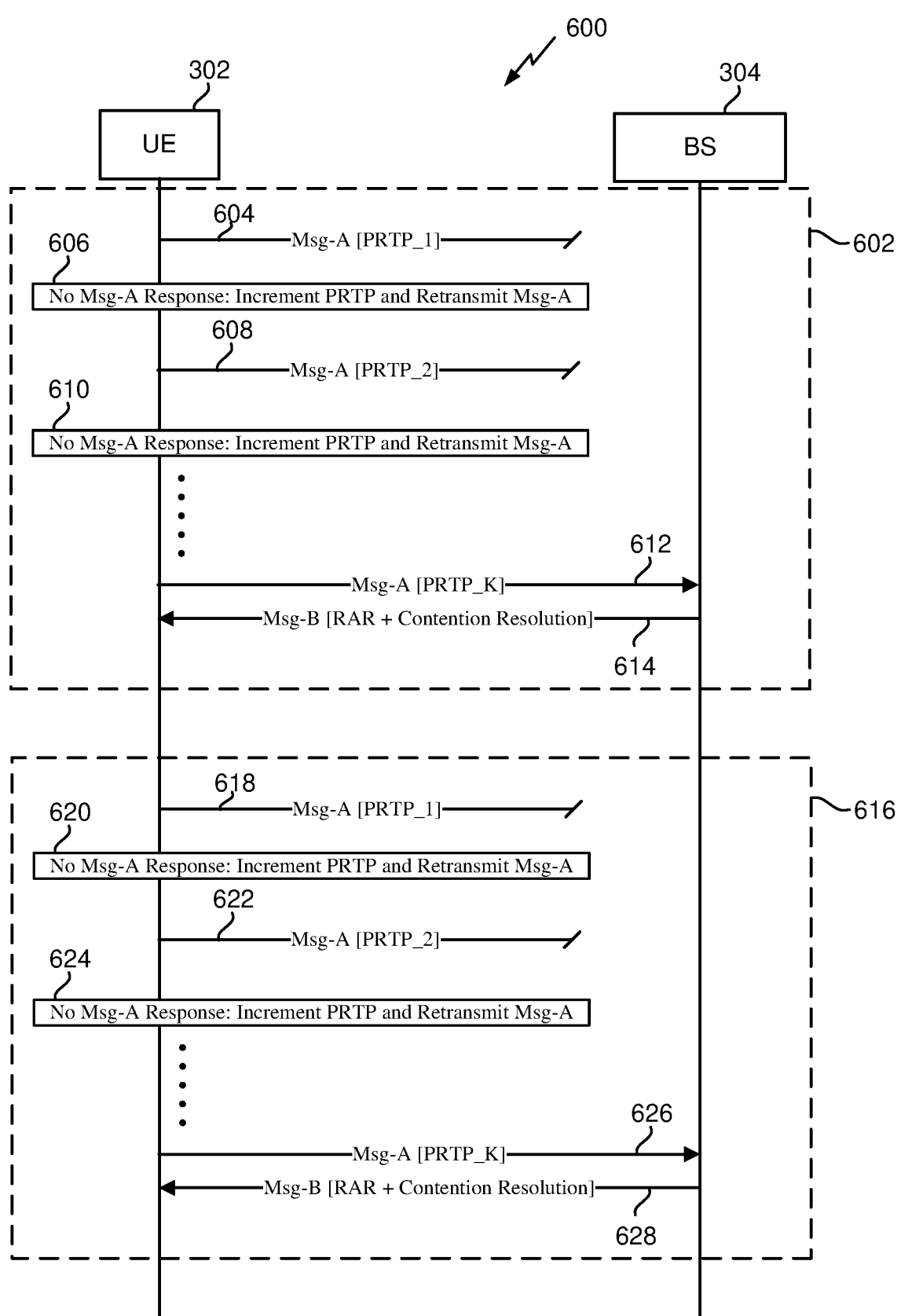
FIG. 6 illustrates a series of 2-Step PRACH procedures in accordance with an embodiment of the disclosure.

As noted above, various device types may be characterized as UEs. Some UEs, such as Massive Internet of Things (M-IoT) devices or narrowband IoT (NB-IoT), may be deployed as stationary devices, where such devices may move intermittently or not at all. PRACH preambles typically begin transmission at an initial default transmission power that is set by a network operator or pre-defined by standard. However, for stationary devices such as M-IoT devices or NB-IoT devices, a final PRACH transmission power that results in success (e.g., receipt of a random access response (RAR) from the network) will typically be the same or at least very close, due to the lack of mobility in such devices. In such cases, beginning the PRACH preamble power ramping procedure using the initial default transmission power may lead to a waste of time and resources, as shown in FIGS. 5-6. Below, the transmission power of the PRACH preamble may be characterized in terms of Preamble Received Target Power (PRTP), whereby PRTP_1 corresponds to the initial default transmission power, PRTP_K corresponds to a final PRACH transmission power that results in success, and PRTP_N corresponds to a maximum PRACH transmission power (e.g., after which the PRACH attempt is deemed to fail if not RAR is received).

FIG. 5 illustrates a series of 4-Step PRACH procedures 500 in accordance with an aspect of the disclosure. The 4-Step PRACH procedures of FIG. 5 are initial access procedures by which UE 302 can establish communication with BS 304. In some designs, the UE which performs the process 500 of FIG. 5 may correspond to a stationary UE, such as an M-IoT device or NB-IoT device.

A first 4-Step PRACH procedure is shown with respect to 502. At 504, UE 302 performs a first attempt to transmit a Message 1 ("Msg-1") of the 4-Step PRACH procedure 502. The Msg-1 of 504 may be characterized herein as a PRACH preamble. In an example, the Msg-1 of 504 may be implemented via a Zadoff-Chu sequence which indicates the presence of a random access attempt and allows BS 304 to estimate a channel between BS 304 and UE 302. At 504, Msg-1 is transmitted at an initial default transmission power (PRTP_1). At 506, UE 302 determines that no Msg-1 response has been received to the Msg-1 transmission from 504, and increments PRTP_1 to PRTP_2. At 508, UE 302 performs a second attempt to transmit Msg-1 in accordance with PRTP_2. This process continues with UE 302 scaling (or ramping up) the transmission power (or PRTP) until a Msg-1 transmitted at PRTP_K successfully reaches BS 304 as shown at 512.

Referring to FIG. 5, at 514, a Message 2 ("Msg-2") of the 4-Step PRACH procedure 502 is transmitted by BS 304 to UE 302. The Msg-2 of 506 may be characterized herein as a RAR. For example, in response to the detected PRACH preamble (or Msg-1) at 512, BS 304 may transmit the Msg-2 of 506 on a downlink (DL) shared channel (SCH) comprising any combination of:

An index of the detected PRACH preamble (or Msg-1) from 512, An uplink timing correction for UE 302, A scheduling grant indicating what resource(s) UE 302 should use for transmission of Message 3 ("Msg-3") of the 4-Step PRACH procedure 502, and A Temporary Cell Radio Network Temporary Identifier (TC-RNTI) used for further communication between UE 302 and BS 304.

In an example, the Msg-2 of 514 may be scheduled on a Physical Downlink Control Channel (PDCCH) using an identity (e.g., a Random Access RNTI (RA-RNTI) which is indicated by the time and frequency resource(s) upon which the PRACH preamble (or Msg-1) from 512 is transmitted.

Referring to FIG. 5, at 516, a Message 3 ("Msg-3") comprising at least a UE identifier (ID) of UE 302 is transmitted by UE 302 to BS 304. In some designs, the Msg-3 is transmitted via DL SCH resource(s) indicated by Physical Uplink Shared Channel (PUSCH) and may be referred to as a Msg-3 PUSCH. In an example, the Msg-3 transmitted at 516 may be transmitted via the UL SCH resource(s) indicated by the Msg-2 from 514. In some designs, device scrambling is used for the transmission of Msg-3 at 516 (e.g., scrambling based on the TC-RNTI assigned via the Msg-2 from 514). Since UE 302 is not in a RRC Connected state at this point, a core network device identifier such as a 40-bit Serving Temporary Mobile Subscriber Identity (S-TMSI) can be used as the UE-ID in the Msg-3 at 516.

Referring to FIG. 5, at 518, a Message 4 ("Msg-4") of the 4-Step PRACH procedure 505 is transmitted by BS 304 to UE 302. In some designs, the Msg-4 of 518 comprises a downlink message for contention resolution as there is some probability of contention associated with the Msg-3 transmission at 516. For example, if multiple UEs transmit the same Msg-1 (512) at the same time, then the multiple UEs may react to the same Msg-2 (514) such that a collision occurs.

At some later point in time, a second 4-Step PRACH procedure is performed at 520. 522-536 of the second 4-Step PRACH procedure 520 correspond to 504-518 of the first second 4-Step PRACH procedure 502, and as such will not be discussed again for the sake of brevity. As will be appreciated, UE 302 ramps the PRACH preamble transmission power to the same level (i.e., PTRP_K) in both the first and second 4-Step PRACH procedures. As noted above, for certain UEs such as stationary UEs, this condition may be occur in a fairly consistent manner, such that the earlier Msg-1 transmission attempts from PRTP_1 through PRTP_K−1 in effect waste both time and power at UE 302.

FIG. 6 illustrates a series of 2-Step PRACH procedures 600 in accordance with an embodiment of the disclosure. Similar to the 4-Step PRACH procedures of FIG. 5, the 2-Step PRACH procedures are initial access procedures by which UE 302 can establish communication with BS 304. However, in the 2-Step PRACH procedures of FIG. 6, the Msg-1 and Msg-3 are transmitted to BS 304 before any response from BS 304 is transmitted as 'Msg-A', and BS 304 sends 'Msg-B' (e.g., comprising Msg-2 and Msg-4) back to the UE 302. In some designs, the UE which performs the process 600 of FIG. 6 may correspond to a stationary UE, such as an M-IoT device or a NB-IoT device.

A first 2-Step PRACH procedure is shown with respect to 602. At 604, UE 302 performs a first attempt to transmit a Msg-A (e.g., a PRACH preamble and associated UE ID information as in Msg-1 and Msg-3) of the 4-Step PRACH procedure 602. At 604, Msg-A is transmitted at an initial default transmission power (PRTP_1). At 606, UE 302 determines that no Msg-A response has been received to the Msg-A transmission from 604, and increments PRTP_1 to PRTP_2. At 608, UE 302 performs a second attempt to transmit Msg-A in accordance with PRTP_2. This process continues with UE 302 scaling (or ramping up) the transmission power (or PRTP) until a Msg-A transmitted at PRTP_K successfully reaches BS 304 as shown at 612. At 614, a Msg-B (e.g., a RAR along with contention resolution as in Msg-2 and Msg-4) is transmitted by BS 304 to UE 302.

At some later point in time, a second 2-Step PRACH procedure is performed at 616. 618-628 of the second 4-Step PRACH procedure 616 correspond to 604-614 of the first second 4-Step PRACH procedure 602, and as such will not be discussed again for the sake of brevity. As will be appreciated, UE 302 ramps the PRACH preamble transmission power to the same level (i.e., PTRP_K) in both the first and second 2-Step PRACH procedures. As noted above, for certain UEs such as stationary UEs, this condition may be occur in a fairly consistent manner, such that the earlier Msg-A transmission attempts from PRTP_1 through PRTP_K−1 in effect waste both time and power at UE 302.

Aspects of the disclosure are directed to determination of initial transmission power for transmission of a PRACH preamble (e.g., Msg-1 or Msg-A) of a PRACH procedure (e.g., 2-Step PRACH procedure or 4-Step PRACH procedure) based upon a final PRACH preamble transmission power associated with a set of historical completed PRACH procedures. For example, in the examples depicted with respect to FIGS. 5-6, in some scenarios, a UE in accordance with some aspects may jump directly to PRTP_K instead of restarting each PRACH procedure at the default initial transmission power of PRTP_1. Such aspects may provide various technical advantages, such as faster PRACH procedures (i.e., less communication latency), reduce power consumption at the UE, and so on.

Figure 7:
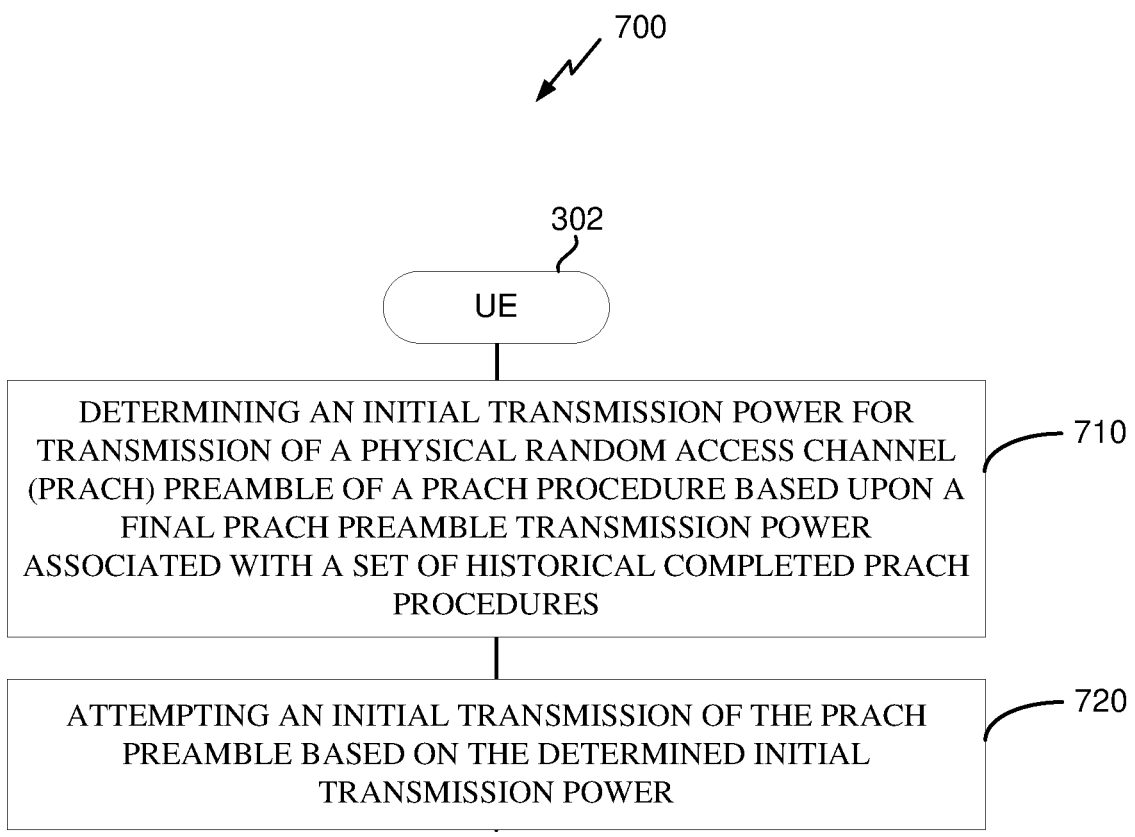
FIG. 7 illustrates an exemplary process of wireless communication, according to aspects of the disclosure.

FIG. 7 illustrates an exemplary process 700 of wireless communication, according to aspects of the disclosure. In an aspect, the process 700 may be performed by UE 302.

At 710, UE 302 (e.g., processing system 332, etc.) determines an initial transmission power for transmission of a PRACH preamble of a PRACH procedure based upon a final PRACH preamble transmission power associated with a set of historical completed PRACH procedures. In some designs, the set of historical completed PRACH procedures may correspond to the most recent PRACH procedures attempted by UE 302. In some designs, the determination at 710 may be triggered by a threshold number (e.g., 5, 10, etc.) of consecutive completed PRACH procedures with the same final PRACH preamble transmission power or with a distribution of final PRACH preamble transmission powers that fall inside of a designated range (e.g., a PRTP_3-PRTP_4, PRTP_5 through PRTP_8, etc.). In the case of a range, the determined initial transmission power may correspond to one of the PRTPs in the range, or a transmission power that is based on (e.g., weighted) the PRTPs in the range.

At 720, UE 302 (e.g., transmitter 314 or 324, etc.) attempts an initial transmission of the PRACH preamble based on the determined initial transmission power.

Referring to FIG. 7, in some designs, UE 302 may be a stationary UE, such as a M-IoT device or NB-IoT device. In some designs, the determined initial transmission power at 710 is higher than a default initial transmission power (e.g., PRTP_1) for transmission of PRACH preambles.

Referring to FIG. 7, in some designs, UE 302 may further determine, in response to a triggering event, to reset the initial transmission power for transmissions of PRACH preambles of subsequent PRACH procedures back to the default transmission power. In some designs, the threshold number of PRACH procedures (e.g., 5 times) subsequent to a latest of the set of historical completed PRACH procedures being performed, a threshold period of time subsequent to the latest of the set of historical completed PRACH procedures elapsing, an inter-cell handoff of the UE, or a combination thereof. In the case of the threshold number of PRACH procedures or threshold period of time, there is a chance that over some amount of time the channel condition for even a stationary UE may change, and resetting back to the default transmission power may help to calibrate the initial transmission power for transmissions of PRACH preambles over time. In the case of inter-cell handoff of the UE, the historical completed PRACH procedures on the UE's prior cell are no longer relevant, such necessitating the reset. In some designs, the threshold number of PRACH procedures or threshold period of time may be used in tandem (e.g., the transmission power is triggered at the earlier of expiration of the period of time or the threshold number of PRACH procedures being reached).

Referring to FIG. 7, in some designs, the final transmission power for each PRACH preamble among the set of PRACH preambles is the same (e.g., PRTP_K as in FIGS. 5-6), and the determining at 710 may set the initial transmission power to the final transmission power. However, as noted above, even in a case where at least some of the final transmission powers are different, the final transmission power for each PRACH preamble among the set of PRACH preambles may still within a designated transmission power range. In such cases, the initial transmission power may be set to a respective transmission power level that falls within the transmission power range (e.g., one of the PRTPs in the range, or some average or weighted average of two or more of the PRTPs, etc.).

Referring to FIG. 7, in some designs, the process 700 may be triggered selectively for UEs operating in accordance with a standalone (SA) mode. In some designs, may be triggered selectively for specific UE types, such as M-IoT UEs or NB-IoT UEs.

Figure 8:
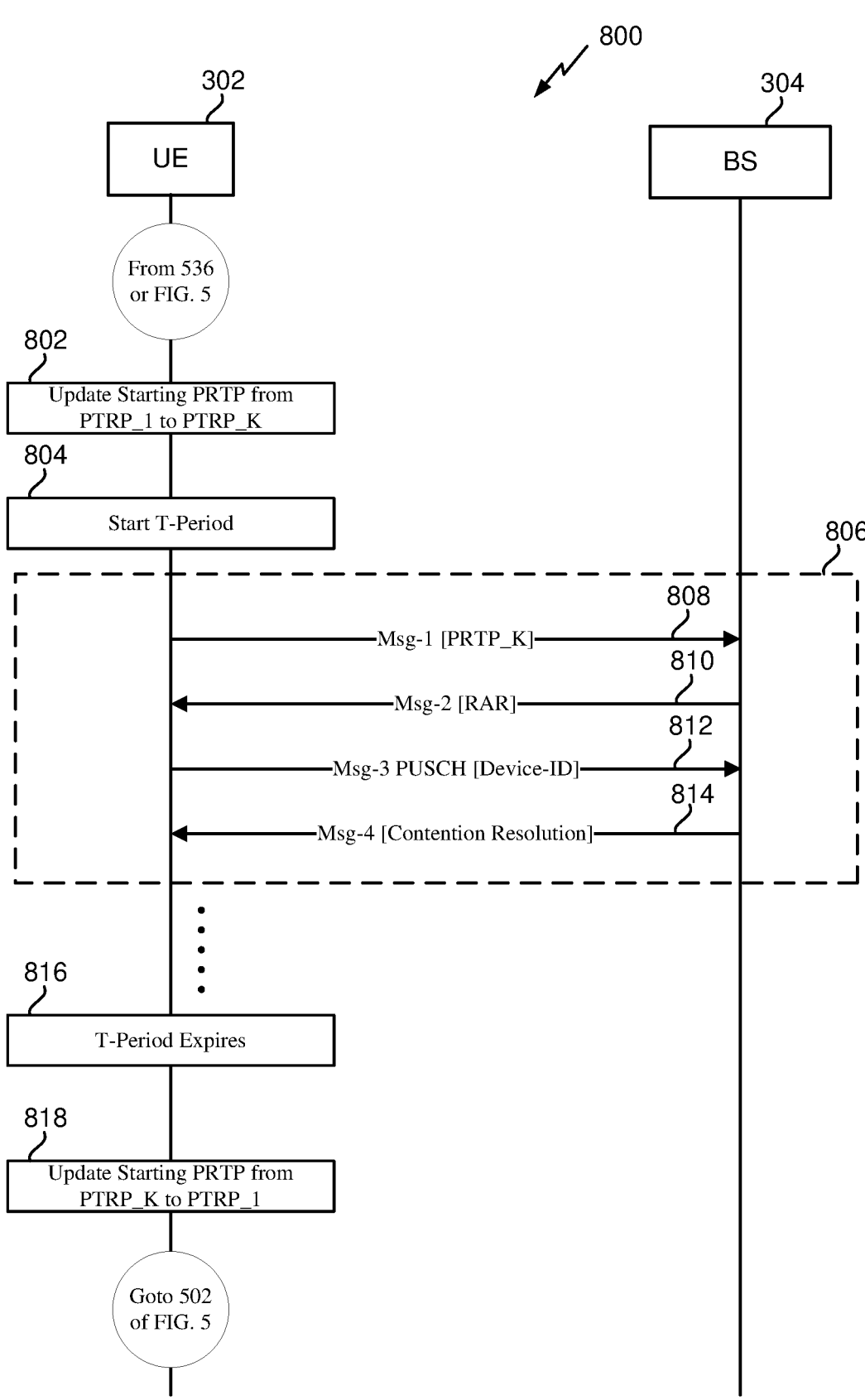
FIG. 8 illustrates an example implementation of the process of FIG. 7, according to aspects of the disclosure.

FIG. 8 illustrates an example implementation 800 of the process 700 of FIG. 7 in accordance with an aspect of the disclosure. In FIG. 8, assume that the process 500 of FIG. 5 has executed, with the 4-Step PRACH procedures 502 and 520 corresponding to two of the set of historical completed PRACH procedures evaluated at 710 of FIG. 7. In this case, further assume for convenience of explanation that the final transmission power for each of the set of historical completed PRACH procedures is PRTP_K, and that the set of historical completed PRACH procedures satisfies the conditions for triggering the determination of 710 (e.g., the set of historical completed PRACH procedures includes a threshold number of consecutive successfully completed PRACH procedures at same or similar final transmission power, etc.).

Under these assumptions, at 802, UE 302 updates the starting PRTP for 4-Step PRACH procedures from PRTP_1 to PRTP_K. At 804, UE 302 starts a timer denoted as T-Period (e.g., 24 hours, etc., which may be configurable by UE 302 or by the network), which sets a duration of time where PRTP_K is permitted to be used as the starting PRTP for 4-Step PRACH procedures.

A 4-Step PRACH procedure is shown with respect to 806. At 808, UE 302 performs a first attempt to transmit a Msg-1 of the 4-Step PRACH procedure 806. In contrast to 504 or 522 of FIG. 5, Msg-1 is transmitted at an initial default transmission power PRTP_K at 808. For this reason, the initial Msg-1 transmission attempt is successfully received by BS 304. The remainder (810-814) of the 4-Step PRACH procedure 806 corresponds to 514-518 or 532-536 of FIG. 5, and as such is not described again here for the sake of brevity.

Any number of 4-Step PRACH procedures such as 806 may be performed at this point so long as T-Period is not expired. At 816, T-Period expires. At 818, in response to the expiration of T-Period at 818, UE 302 updates the starting PRTP for 4-Step PRACH procedures from PRTP_K back to PRTP_1. At this point, the process returns to 502 of FIG. 5 where PRTP_1 is used as the starting PRTP for 4-Step PRACH procedures. However, when sufficient triggering criteria are once again detected, the process 500 of FIG. 5 may exit and the process 800 of FIG. 8 may execute once again.

Figure 9:
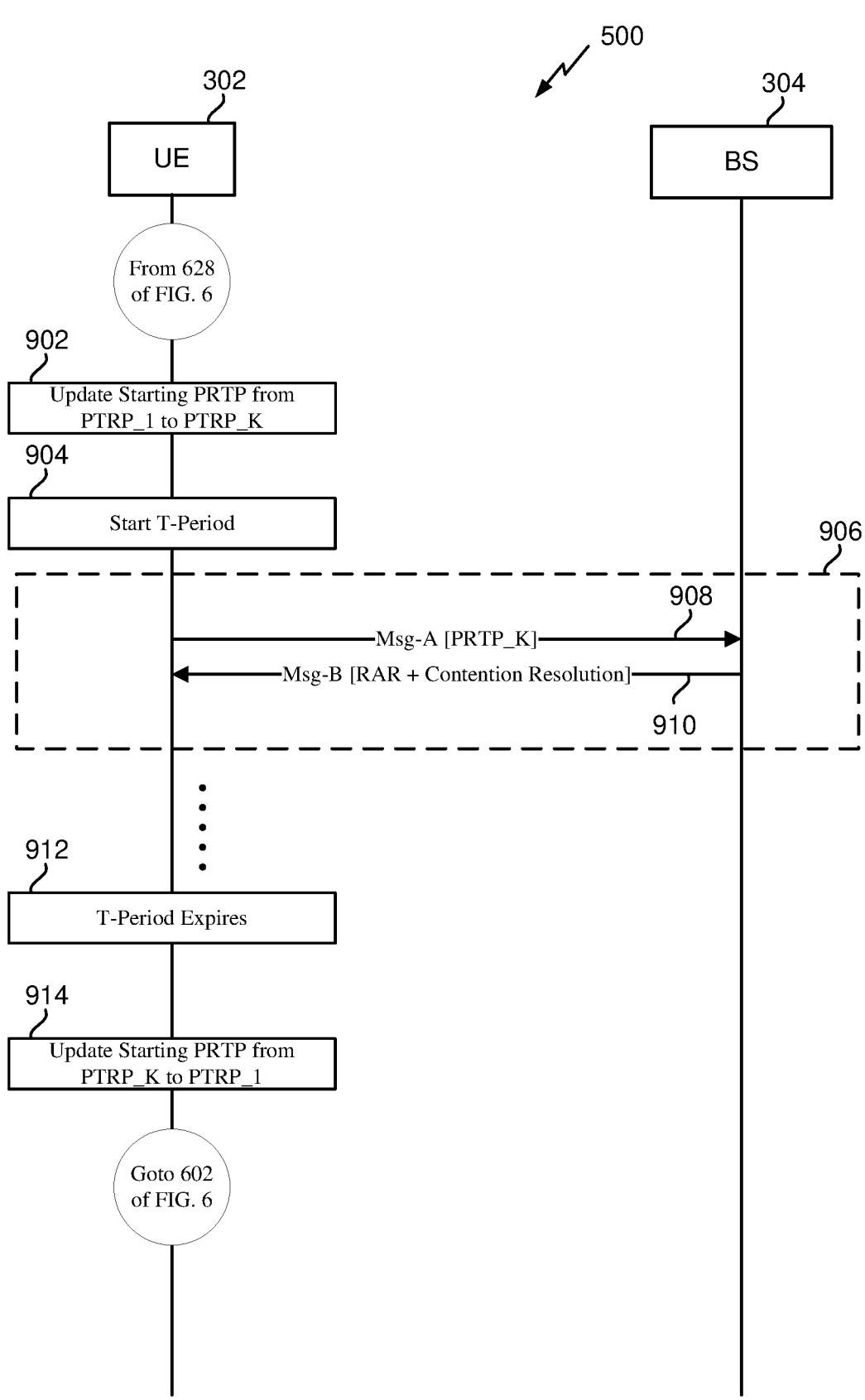
FIG. 9 illustrates another example implementation of the process of FIG. 7, according to aspects of the disclosure.

FIG. 9 illustrates an example implementation 900 of the process 700 of FIG. 7 in accordance with another aspect of the disclosure. In FIG. 9, assume that the process 600 of FIG. 6 has executed, with the 2-Step PRACH procedures 602 and 616 corresponding to two of the set of historical completed PRACH procedures evaluated at 710 of FIG. 7. In this case, further assume for convenience of explanation that the final transmission power for each of the set of historical completed PRACH procedures is PRTP_K, and that the set of historical completed PRACH procedures satisfies the conditions for triggering the determination of 710 (e.g., the set of historical completed PRACH procedures includes a threshold number of consecutive successfully completed PRACH procedures at same or similar final transmission power, etc.).

Under these assumptions, at 902, UE 302 updates the starting PRTP for 2-Step PRACH procedures from PRTP_1 to PRTP_K. At 904, UE 302 starts a timer denoted as T-Period (e.g., 24 hours, etc., which may be configurable by UE 302 or by the network), which sets a duration of time where PRTP_K is permitted to be used as the starting PRTP for 2-Step PRACH procedures.

A 2-Step PRACH procedure is shown with respect to 906. At 908, UE 302 performs a first attempt to transmit a Msg-A of the 2-Step PRACH procedure 906. In contrast to 604 or 618 of FIG. 6, Msg-A is transmitted at an initial default transmission power PRTP_K at 908. For this reason, the initial Msg-A transmission attempt is successfully received by BS 304. The remainder (910) of the 2-Step PRACH procedure 906 corresponds to 614 or 628 of FIG. 6, and as such is not described again here for the sake of brevity.

Any number of 2-Step PRACH procedures such as 906 may be performed at this point so long as T-Period is not expired. At 912, T-Period expires. At 914, in response to the expiration of T-Period at 912, UE 302 updates the starting PRTP for 2-Step PRACH procedures from PRTP_K back to PRTP_1. At this point, the process returns to 602 of FIG. 6 where PRTP_1 is used as the starting PRTP for 2-Step PRACH procedures. However, when sufficient triggering criteria are once again detected, the process 600 of FIG. 6 may exit and the process 900 of FIG. 9 may execute once again.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Clause 1. A method of operating a user equipment (UE), comprising: determining an initial transmission power for transmission of a physical random access channel (PRACH) preamble of a PRACH procedure based upon a final PRACH preamble transmission power associated with a set of historical completed PRACH procedures; and attempting an initial transmission of the PRACH preamble based on the determined initial transmission power.

Clause 2. The method of clause 1, wherein the UE is a stationary UE.

Clause 3. The method of clause 2, wherein the stationary UE is a Massive Internet of Things (M-IoT) device Narrowband (NB)-IoT, etc.

Clause 4. The method of any of clauses 1 to 3, wherein the determined initial transmission power is higher than a default initial transmission power for transmission of PRACH preambles.

Clause 5. The method of clause 4, further comprising: determining, in response to a triggering event, to reset the initial transmission power for transmissions of PRACH preambles of subsequent PRACH procedures back to the default transmission power.

Clause 6. The method of clause 5, wherein the triggering event comprises: a threshold number of PRACH procedures subsequent to a latest of the set of historical completed PRACH procedures being performed, a threshold period of time subsequent to the latest of the set of historical completed PRACH procedures elapsing, an inter-cell handoff of the UE, or a combination thereof.

Clause 7. The method of any of clauses 1 to 6, wherein the final transmission power for each PRACH preamble among the set of PRACH preambles is the same, and wherein the determining sets the initial transmission power to the final transmission power.

Clause 8. The method of any of clauses 1 to 7, wherein the final transmission power for each PRACH preamble among the set of PRACH preambles falls within a transmission power range, and wherein the determining sets the initial transmission power to a respective transmission power level that falls within the transmission power range.

Clause 9. An apparatus comprising a memory and at least one processor communicatively coupled to the memory, the memory and the at least one processor configured to perform a method according to any of clauses 1 to 8.

Clause 10. An apparatus comprising means for performing a method according to any of clauses 1 to 8.

Clause 11. A non-transitory computer-readable medium storing computer-executable instructions, the computer-executable comprising at least one instruction for causing a computer or processor to perform a method according to any of clauses 1 to 8.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:

determining an initial transmission power for transmission of a physical random access channel (PRACH) preamble of a PRACH procedure based upon a final PRACH preamble transmission power associated with a set of historical completed PRACH procedures;

attempting an initial transmission of the PRACH preamble based on the determined initial transmission power, wherein the determined initial transmission power is higher than a default initial transmission power for transmission of PRACH preambles; and determining, in response to a triggering event, to reset the initial transmission power for transmissions of PRACH preambles of subsequent PRACH procedures back to the default transmission power, wherein the triggering event comprises:

a threshold number of PRACH procedures subsequent to a latest of the set of historical completed PRACH procedures being performed, a threshold period of time subsequent to the latest of the set of historical completed PRACH procedures elapsing, an inter-cell handoff of the UE, or a combination thereof.

2. The method of claim 1, wherein the UE is a stationary UE.

3. The method of claim 2, wherein the stationary UE is a Massive Internet of Things (M-IoT) device or a Narrowband (NB)-IoT.

4. The method of claim 1, wherein each final transmission power for the set of historical completed PRACH procedures is the same, and wherein the determining sets the initial transmission power to the final transmission power.

5. The method of claim 1, wherein each final transmission power for the set of historical completed PRACH procedures falls within a transmission power range, and wherein the determining sets the initial transmission power to a respective transmission power level that falls within the transmission power range.

6. A user equipment (UE), comprising:

means for determining an initial transmission power for transmission of a physical random access channel (PRACH) preamble of a PRACH procedure based upon a final PRACH preamble transmission power associated with a set of historical completed PRACH procedures;

means for attempting an initial transmission of the PRACH preamble based on the determined initial transmission power, wherein the determined initial transmission power is higher than a default initial transmission power for transmission of PRACH preambles; and means for determining, in response to a triggering event, to reset the initial transmission power for transmissions of PRACH preambles of subsequent PRACH procedures back to the default transmission power, wherein the triggering event comprises:

a threshold number of PRACH procedures subsequent to a latest of the set of historical completed PRACH procedures being performed, a threshold period of time subsequent to the latest of the set of historical completed PRACH procedures elapsing, an inter-cell handoff of the UE, or a combination thereof.

7. The UE of claim 6, wherein the UE is a stationary UE.

8. The UE of claim 7, wherein the stationary UE is a Massive Internet of Things (M-IoT) device or a Narrowband (NB)-IoT.

9. The UE of claim 6, wherein each final transmission power for the set of historical completed PRACH procedures is the same, and wherein the means for determining sets the initial transmission power to the final transmission power.

10. The UE of claim 6, wherein each final transmission power for the set of historical completed PRACH procedures falls within a transmission power range, and wherein the means for determining sets the initial transmission power to a respective transmission power level that falls within the transmission power range.

11. A user equipment (UE), comprising:

a memory;

at least one transceiver; and at least one processor communicatively coupled to the memory and the at least one transceiver, the at least one processor configured to:

determine an initial transmission power for transmission of a physical random access channel (PRACH) preamble of a PRACH procedure based upon a final PRACH preamble transmission power associated with a set of historical completed PRACH procedures;

attempt an initial transmission of the PRACH preamble based on the determined initial transmission power, wherein the determined initial transmission power is higher than a default initial transmission power for transmission of PRACH preambles; and determine, in response to a triggering event, to reset the initial transmission power for transmissions of PRACH preambles of subsequent PRACH procedures back to the default transmission power, wherein the triggering event comprises:

a threshold number of PRACH procedures subsequent to a latest of the set of historical completed PRACH procedures being performed, a threshold period of time subsequent to the latest of the set of historical completed PRACH procedures elapsing, an inter-cell handoff of the UE, or a combination thereof.

12. The UE of claim 11, wherein the UE is a stationary UE.

13. The UE of claim 12, wherein the stationary UE is a Massive Internet of Things (M-IoT) device or a Narrowband (NB)-IoT.

14. The UE of claim 11, wherein each final transmission power for the set of historical completed PRACH procedures is the same, and wherein the determination sets the initial transmission power to the final transmission power.

15. The UE of claim 11, wherein each final transmission power for the set of historical completed PRACH procedures falls within a transmission power range, and wherein the determination sets the initial transmission power to a respective transmission power level that falls within the transmission power range.

16. A non-transitory computer-readable medium containing instructions stored thereon, for causing at least one processor in a user equipment (UE) to:

determine an initial transmission power for transmission of a physical random access channel (PRACH) preamble of a PRACH procedure based upon a final PRACH preamble transmission power associated with a set of historical completed PRACH procedures; and attempt an initial transmission of the PRACH preamble based on the determined initial transmission power, wherein the determined initial transmission power is higher than a default initial transmission power for transmission of PRACH preambles; and determine, in response to a triggering event, to reset the initial transmission power for transmissions of PRACH preambles of subsequent PRACH procedures back to the default transmission power, wherein the triggering event comprises:

a threshold number of PRACH procedures subsequent to a latest of the set of historical completed PRACH procedures being performed, a threshold period of time subsequent to the latest of the set of historical completed PRACH procedures elapsing, an inter-cell handoff of the UE, or a combination thereof.

17. The non-transitory computer-readable medium of claim 16, wherein the UE is a stationary UE.

18. The non-transitory computer-readable medium of claim 17, wherein the stationary UE is a Massive Internet of Things (M-IoT) device or a Narrowband (NB)-IoT.

* * * * *